Sept. 16, 1952     F. SUTTON     2,610,819
AUTOMATIC STOP AND VENT VALVE
Filed Sept. 4, 1945
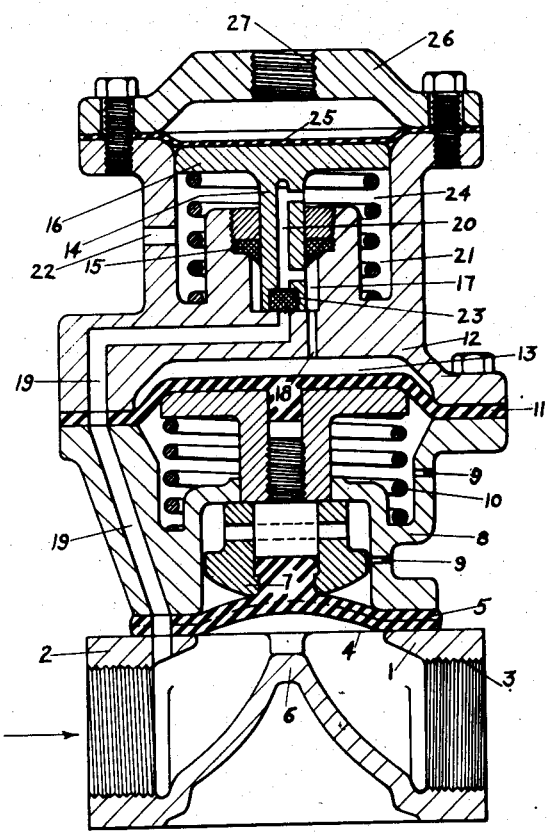
Inventor
*FRANK SUTTON*
By *Simon Broder*
Attorney Patented Sept. 16, 1952

2,610,819

UNITED STATES PATENT OFFICE 2,610,819

AUTOMATIC STOP AND VENT VALVE

Frank Sutton, Cwmbran, Newport, England, assignor to Saunders Valve Company Limited, Cwmbran, Newport, England, a corporation of Great Britain Application September 4, 1945, Serial No. 614,410
In Great Britain September 4, 1944

4 Claims. (Cl. 251—23)

This invention relates to an automatically controlled valve.

In rock drilling and like operations it is common practice to employ a pneumatic drill or similar tool, and to use a jet of water under high pressure to remove the detritus resulting from the action of the tool. If the water jet fails the tool is likely to suffer damage.

The object of the present invention is a valve which will safeguard the drill against operation in the absence of a sufficient water supply. The valve is of the diaphragm type and controls the supply of air for operating the drill. It is itself controlled by the water supply.

As, however, the air pressure is usually liable to fairly wide variation, and therefore the force needed to close the valve varies, it is not wholly satisfactory to employ the water pressure directly to operate the valve. According to this invention the valve is operated pneumatically by the pressure air which it controls, and the admission of air for operating the valve is controlled by an auxiliary valve normally held closed by water pressure. The invention is not limited in its application to pneumatic drills, but may be used in any case where it is desired that the flow of air shall be contingent upon the maintaining of the pressure of an auxiliary fluid.

A typical construction embodying the invention is shown by way of example in axial section in the accompanying drawing.

The diaphragm valve comprises, as usual, a main air channel 1 threaded at its ends 2, 3 or otherwise adapted for connection into the pipe through which the pressure air is supplied to the drill. In the air channel 1 is a lateral opening 4 around which is a flat seating for the valve diaphragm 5. Opposite this opening there is a weir 6 extending across the main air channel 1. On the outer side of the rubber or like diaphragm 5 is an actuator 7 attached to the diaphragm and of suitable shape to press said diaphragm upon the weir 6 so as to interrupt the air passage. The direction of flow of the air is indicated by the arrow, that is to say 2 is the inlet or upstream side of the valve.

The diaphragm 5 is clamped upon its seating by an actuator housing 8 bolted to the main air channel 1. This housing provides guides for the actuator 7 and is open to the atmosphere through the apertures 9. A spring 10 may be provided in compression beneath the top flange of the actuator 7 to hold the valve open to its full extent; but this spring can be dispensed with and the valve be held open only by the air pressure beneath the diaphragm 5.

The actuator housing 8 is closed by a movable wall by which the actuator is pneumatically operated. This may be a piston sliding in a cylindrical part of the housing, or, as shown in the example illustrated, it may be a valve-operating diaphragm 11.

This diaphragm 11 is held in fluid-tight fashion upon the top flange of the actuator housing 8 by the bottom flange of an auxiliary valve casing 12. In this casing, next to the diaphragm or movable wall of the actuator housing, is a pressure chamber 13. The area of the diaphragm 11 exposed to the pressure reigning in the chamber 13 is so much larger than the area of the valve diaphragm 5 that if the pressure air is admitted to the chamber 13 the spring 10 and the pressure beneath the diaphragm 5 will be overcome and the valve will be closed.

Admission of air to the chamber 13 is controlled by an auxiliary valve, and to ensure the ready opening of the main valve when the air supply to the chamber 13 is cut off an exhaust valve is provided for connecting the chamber 13 with the atmosphere. These valves should either be of a type, for instance slide valves, which are unaffected by the pressure of the fluid passing through them, or they should present so small an area to the pressure of the air that variations of that pressure do not sensibly affect the operation.

In the construction illustrated the auxiliary valve and the exhaust valve are combined. An auxiliary valve body 14 slides in a gland rendered fluid tight by the rubber cone 15, within the auxiliary valve casing 12, and is fitted with an expanded head 16 which is further guided by the casing 12. From the small auxiliary valve chamber 17 which is sealed by the gland 15 a passage 18 leads into the pressure chamber 13; another passage 19 formed in the wall of the auxiliary valve casing 12 in the diaphragm 11, and in the wall of the actuator housing 8, leads to the main air channel 1 on the upstream side of the weir 6; and an exhaust passage 20 in the auxiliary valve body 14 leads to the space 21 beyond the gland 15 and so to the atmosphere through the aperture 22. The lower end of passage 20 forms with the rubber cone 15 an exhaust valve of the slide valve type. A rubber cushion 23 in the end of the auxiliary valve body 14 forms with the mouth of the passage 19 an auxiliary valve susceptible to variation of fluid pressure but of so small an area as to be substantially unaffected by it. A spring 24 compressed between the bottom of the auxiliary valve casing 12 and the head 16 determines the pressure needed to hold the auxiliary valve 23 closed.

The auxiliary valve casing 12 is closed at the top by a movable wall. This, too, may be a conventional piston moving in the cylindrical part of the casing 12, or, as illustrated, it may be a diaphragm 25 against which the head 16 is pressed by spring 24. The diaphragm 25 is held in fluid tight fashion upon the upper flange of the auxiliary valve casing 12 by a cap 26 having a screw thread 27 or other means for attachment to a conduit branched from the water supply pipe. The cap 26 is secured to the auxiliary valve casing 12 by set screws.

The operation of the valve is as follows: so long as the water pressure is substantial and enough to prevent damage to the drill, say 15 to 20 pounds per square inch, the parts remain in the position illustrated. The water pressure on the diaphragm 25 holds closed the auxiliary valve 23, while the pressure chamber 13 is connected to the atmosphere through the exhaust valve 15, 20 and aperture 22. Hence the valve diaphragm 5 is held raised by the air pressure in the main air channel 1 as well as by the spring 10. The normal water pressure may be much higher, say ten pounds less than the air pressure, but its only effect is to bring the auxiliary valve body 14 into contact with the bottom of the auxiliary valve casing.

If, however, the water pressure falls below a limit of, say, 15 pounds per square inch predetermined by the spring 24, the auxiliary valve will be lifted by spring 24, and pressure air will find its way through passages 19 and 18 to the pressure chamber 13, where it will depress the diaphragm 11 against the action of spring 10 and cause the actuator 7 to close the valve 5, 6. It makes no difference to the satisfactory closing of the valve that the air pressure may vary, say from 70 to 100 pounds per square inch, for if the pressure beneath the diaphragm 5 is increased so is also the pressure in the pressure chamber 13. Provision may be made, if desired, for positively limiting the descent of the actuator in order that undue pressure may not be placed upon the diaphragm 5.

It is important that the exhaust valve should close before the auxiliary valve admits pressure air to the pressure chamber 13. In the construction shown this is ensured by the use of a sufficiently compressible rubber plug 23, which continues to seal the passage 19 until the passage 20 is sealed by the rubber cone 15. Restoration of the water pressure will cause the valve to be re-opened by closing the auxiliary valve 23, 19 and opening the exhaust valve 20, 15.

What I claim is:

1. In a pneumatic main valve actuated by the pressure controlled thereby under the control of an auxiliary valve responsive to the pressure of a fluid other than that controlled by said main valve, an auxiliary valve structure comprising a sliding valve stem, a closed chamber into which said stem projects, a gland through which said stem makes a sliding joint with said chamber, a duct leading from the upstream side and opening into said chamber in alignment with said stem so as to be closed thereby when said stem is in its innermost position, and a spring pressing said auxiliary valve outwardly, said stem having an exhaust passage therein opening at one end on the side of the stem in such position as to be open to said chamber when the stem is in its innermost position and to be covered by said gland when the stem is outermost in its position and the other end of said exhaust passage lying at all times outside said gland, and an outlet leading from said chamber.

2. In an auxiliary valve structure as set forth in claim 1 a compressible plug on said stem forming the actual valve for the duct, said plug being sufficiently expansible to hold said duct closed when the stem moves outwards until the said opening of the exhaust passage on the side of said stem is covered by said gland.

3. In a pneumatic main valve actuated by the pressure controlled thereby under the control of an auxiliary valve responsive to the pressure of a fluid other than that controlled by said main valve; an auxiliary valve structure comprising a sliding valve stem, a closed chamber into which said stem projects, said stem making a sliding joint with said chamber, a duct leading from the upstream side and opening into said chamber in alignment with said stem so as to be closed thereby when said stem is in its innermost position, an outlet leading from said chamber, means tending to move said auxiliary valve outwardly, said stem having an exhaust passage therein opening at one end on the side of the stem in such position as to be open to said outlet when the stem is in its innermost position and to be closed by said chamber when the stem is outermost in its position, the other end of said exhaust passage being at all times outside said chamber.

4. In a pneumatic main valve actuated by the pressure controlled thereby under the control of an auxiliary valve responsive to the pressure of a fluid other than that controlled by said main valve; an auxiliary valve structure comprising a sliding valve stem, a closed chamber into which said stem projects, said stem making a sliding joint with said chamber, a duct leading from the upstream side and opening into said chamber in alignment with said stem so as to be closed thereby when said stem is in its innermost position, an outlet leading from said chamber, and a spring pressing said auxiliary valve outwardly, said stem having an exhaust passage therein opening at one end on the side of the stem in such position as to be open to said outlet when the stem is in its innermost position and to be closed by said chamber when the stem is outermost in its position, the other end of said exhaust passage being at all times outside said chamber.

FRANK SUTTON.

REFERENCES CITED

The following references are of record in the file of this patent:

UNITED STATES PATENTS

| Number | Name | Date |
| --- | --- | --- |
| 492,100 | Ord | Feb. 21, 1893 |
| 625,118 | Miller | May 16, 1899 |
| 687,273 | Schoeffel | Nov. 26, 1901 |
| 1,110,320 | Fulton | Sept. 15, 1914 |
| 2,047,581 | Grissett | July 14, 1936 |
| 2,199,549 | Saunders | May 7, 1940 |
| 2,287,936 | Hose | June 30, 1942 |